Aug. 26, 1924.
A. J. HOULE
1,506,527
TROLLEY RETRIEVER
Filed Jan. 22, 1924
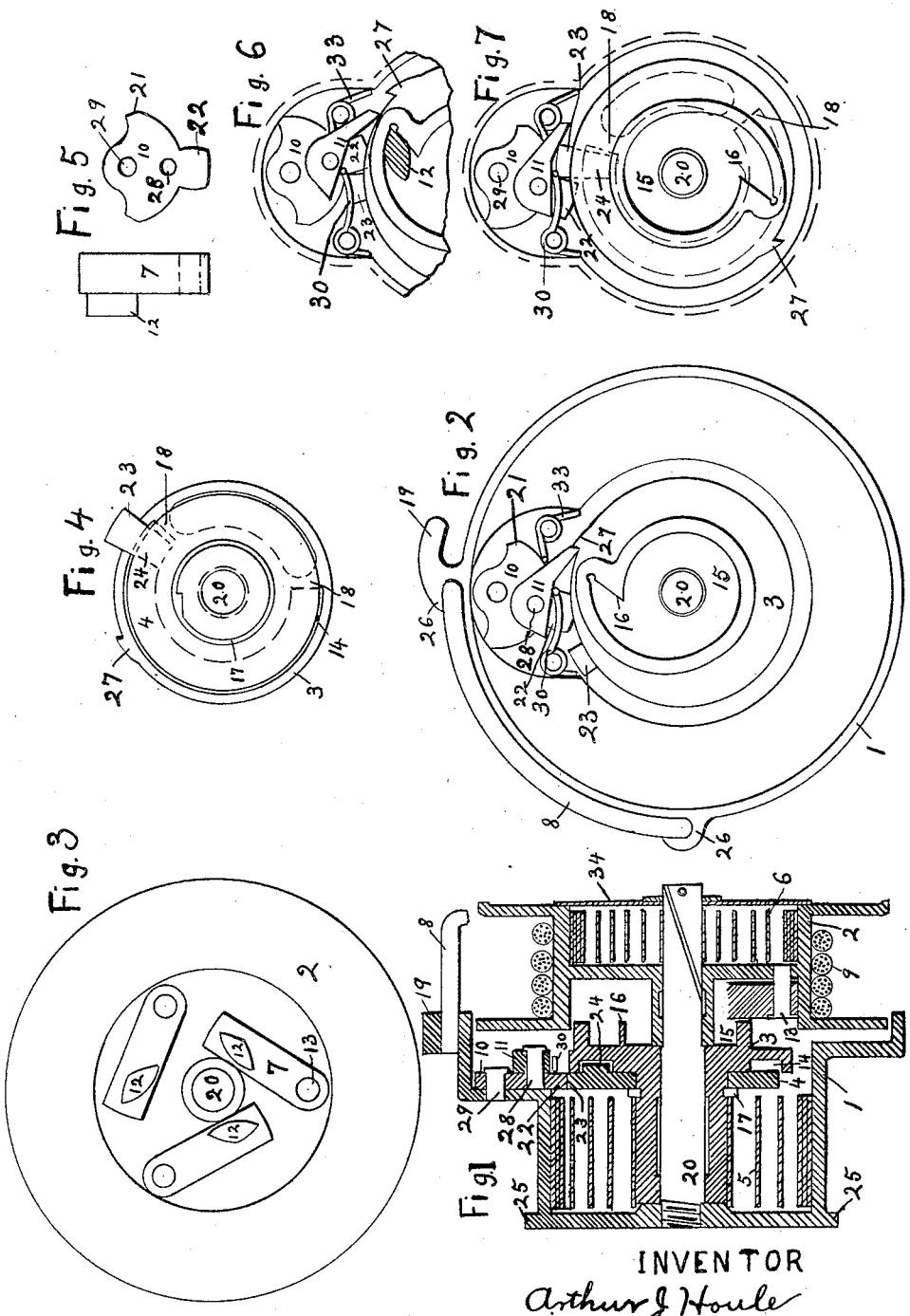
INVENTOR
Arthur J Houle Patented Aug. 26, 1924.

1,506,527

UNITED STATES PATENT OFFICE.

ARTHUR J. HOULE, OF HOLYOKE, MASSACHUSETTS.

TROLLEY RETRIEVER.

Application filed January 22, 1924. Serial No. 687,833.

*To all whom it may concern:*

Be it known that I, ARTHUR J. HOULE, a citizen of the United States, residing at Holyoke, in the county of Hampden and State of Massachusetts, have invented new and useful Improvements in Trolley Retrievers, of which the following is a specification.

My invention relates to trolley retrievers.

The object of my invention is to provide means which will operate to take up the slack in the trolley-pole retaining and operating cord, and also operate automatically to quickly withdraw the trolley-pole head downwardly when it runs off the wire and rises under the action of the tension spring at its base.

Another object of my invention, is the elimination of impelling springs on the rotatable members to connect them with the normally stationary members. Also to provide means independent of impelling springs which shall operate to prevent the rebounding of the trolley pole after the power spring has ceased to act upon it, whereby the mechanism can't be locked by weak or broken springs.

My invention consists in providing a spring operated slack absorbing reel and a power spring having one end connected to a stationary member and the other end releasably connected under strain to said member and providing essentially of peculiar locking and releasing means between said stationary member and the reel to connect said reel with the releasable end of said power spring independent of impelling springs on the rotatable members, being automatically engageable by the abnormal rotation of the reel when the trolley jumps the wire and acts when the power spring is released to rotate said reel in reverse direction and the reel may continue to revolve after the power spring has ceased to act a predetermined limit upon it to take in the slack and retains the reel to hold the trolley-pole in the lowest position to which it is brought by momentum.

My invention consists further in providing a device of this character which shall be simple and effective in its construction, and operation, the operator cannot neglect to rewind the power spring, being permanently set by eliminating springs on the centrifugal pawls which are liable to get weak and cause the mechanism to act too quick.

My invention consists further in other novel features and constructions to be hereinafter more fully described and for the purpose of illustration, I have in the accompanying drawing shown one form of retrieving mechanism embodying my invention.

Fig. 1, shows a vertical, longitudinal, sectional view of the mechanism involving my invention.

Fig. 2, shows the front of the mechanism with the rope reel removed.

Fig. 3, shows the inner side of the rope reel with the centrifugal pawls or dogs pivoted thereto.

Fig. 4, shows the rear of the intermediate member and the member engaging it to limit its rotation.

Fig. 5, shows a centrifugal pawl and the rocker.

Figures 6 and 7 are fragmentary views showing the different positions of the power spring retaining pawl and the intermediate member.

Similar figures refer to similar parts throughout the several views.

On the drawing the stationary member or casing 1 which may be of any desirable form, size and construction, is hereby shown as a hollow shell to partly cover the end of the rope reel, an inner shell incasing the power spring, an inner wall or base with a central opening for a shaft 20, a recess for the pawl mechanism. The casing is provided with any desirable lugs adapted to be attached to a suitable part of the car of which 25 shows one form. A rope guard may be cast integrally with the casing or lugs provided thereon as shown at 26, and a rope guard 8 made of round stock and bended to fit in the holes of the lugs 26. 19 shows a hook for the rope.

As best seen in Fig. 1, the drum or rope reel 2 may be made of pressed steel or cast or partly of both, it is loosely mounted on shaft 20 which is centrally secured to casing. As hereinafter described, said reel being formed with a peripheral wall, flanges, a web between the opposite ends of the reel and a hub encircling the shaft 20 and projecting from one side of the web toward the inner wall of the casing, the peripheral wall having the trolley rope 9 partly wound thereon; and the web, the hub and the opposing portion of the peripheral wall form a recess within each end of the reel. The slack absorbing spring 6 has its outer end connected to the peripheral wall or the web in a recess of the reel, and the inner end connected to the shaft 20. This spring is constantly under strain to take up the slack of the rope or cord 9 wound around the reel at its lower end, the upper end of the rope is secured to the trolley-pole.

3 indicates an intermediate rotatable member concentric with said reel and having an elongated hub loosely encircling the shaft 20. A power or retriever spring 5 having its inner end connected to the hub and its outer end connected to the casing, a tooth 27 is provided on its periphery to hold said power spring under strain, on one side of the wall a concentrical guide 15 is formed with an engaging tooth 16 therein, the opposite of the wall has a recess 14 formed therein with a lug 18 to limit its rotation.

4 indicates a member encircling the hub of the intermediate member 3 and its relative rotation with the intermediate being limited by its lug 24 engaging lug 18 on the intermediate member, another lug 23 limits its relative rotation with the casing by striking the rocker lug 22, the lugs being located to limit the rotation of the intermediate in spring winding direction so the tooth 16 will be in an upwardly position and limiting its rotation in opposite direction so the tooth 16 will be in a downwardly position. In practice and as shown, I limit the rotation of the intermediate to one and a half turns and can be arranged to limit it to one half turn by omitting member 4 and changing lug 18 to engage the rocker 10, it also can be arranged to limit it to two and one half turns or more by adding collars with lugs on both sides between members 3 and 4.

The power spring being wound enough to overcome the upward pull of the trolley-pole and its pressure against the lugs holds the intermediate 3 in a position having tooth 16 in the concentrical guide downwardly as shown in Fig. 7, before winding the power spring. A pawl 11 pivoted to the rocker 10 at 28 normally holds the power spring when engaged to ratchet tooth 27 on the intermediate member. A pawl actuating spring 30 secured to the casing tends to engage and disengage pawl 11 when said pawl is thrown beyond its pivot over said spring when moving the rocker 10. A spring 33 produces frictional resistance when moving the rocker. 17 shows a spring collar encircling the hub of the intermediate in a groove to prevent lateral movement of member 4.

34 shows a cover on the end of the reel. 7 shows the centrifugal dog or pawl of which one or more can be used and are pivoted to the web or wall of the reel at 13, the free end of the dogs are provided with lateral offset portions 12 which normally rotate in groove or guide 15 provided on the intermediate member 3 and are engagable to tooth 16 in said guide by centrifugal force when the reel is abnormally rotated, that is when the tooth is in an upwardly position and when the tooth is in a downwardly position a dog will drop and engage therewith to prevent the reel from rotating in rope unwinding direction, but will be free to rotate in rope winding direction.

The operator can bring down the trolley-pole but he can't bring it up unless he winds the power spring, so the operator cannot neglect the winding of said spring.

The operation of the mechanism may be described as follows:

When the predetermined limit is reached when winding the power spring the lugs on the intermediate and member 4 will reach their opposite sides and engage the rocker moving it to the opposite side, this will throw the retaining pawl 11 beyond its pivot over its actuating spring and reverse the spring action on said pawl throwing it into the path of the tooth 27 on the intermediate member as shown in Fig. 6, by letting the rope go the pawl 11 will engage the tooth 27 and the pressure of the power spring will overcome the frictional resistance of the spring 33 and push the rocker 10 on the opposite side throwing the pawl 11 beyond its pivot over its actuating spring 30 and reverse its action ready to disengage the pawl when the pressure is released between said pawl and the tooth 27 as shown in Fig. 2. By pulling the rope slightly downwardly the slack absorbing spring will turn the reel and disengage the dog 7 from the tooth 16, the tooth being in an upwardly position permitting the dogs to travel freely in the guide.

In the present condition the rope is permitted to move up and down with the trolley as the latter follows the variation in the height of the wire, the slack absorbing spring 6 will keep the rope under tension. When the trolley jumps off the wire as it frequently does it will give a sudden pull on the rope due to the spring at its base and cause the reel to rotate quickly and one of the centrifugal dogs will engage the tooth 16, the momentum of the reel and the upward pull of the rope will cause the intermediate to rotate slightly by overcoming the pressure of the power spring and release the pressure between tooth 27 and pawl 11, the pawl actuating spring 30 will disengage the pawl and hold it out of the path of tooth 27 releasing the power spring which will turn the intermediate to its predetermined limit with tooth 16 in a downwardly position. The reel being connected to the intermediate by the dog 7 is quickly rotated bringing the trolley below the wire, the momentum acquired by the trolley-pole and the reel will cause the reel to rotate after the power spring has ceased to act upon it and wind more rope than is required to be pulled out to wind the power spring, the tooth 16 being downwardly will prevent the dogs on the reel to rotate in rope unwinding direction and will hold the trolley-pole at its position carried by momentum. The power spring is rewound by simply pulling the rope.

What I claim as my invention is:

1. A rotary retriever member adapted to be limited in its rotation in both directions being provided with a concentrical guide with an engaging tooth therein to normally hold the free end of a dog toward the center of revolution when normally held with said tooth in an upwardly position and permit a dog to drop into engagement with said tooth when rotated to a predetermined different position.

2. In a retriever in combination a rope reel, a centrifugally acting dog having one end pivoted to said rope reel, a rotary member adapted to be limited in its rotation being provided with a guide to normally control the free end of said dog.

3. In a retriever in combination, a rotatable member, centrifugally acting dogs carried by said rotatable member, another rotatable member adapted to be limited in its rotation in both directions being provided with an engageable guide for controlling and engaging the free end of said centrifugally acting dogs.

4. In a retriever in combination, a spring rotated slack absorbing reel for the trolley rope, a power spring adapted to be thrown into action by the abnormal rotation of said reel to wind the trolley rope during which said power spring unwinds to a predetermined limit, including means between said power spring and reel thrown into action by the unwinding of said power spring for retaining said reel in the position to which it is carried by momentum after the power spring has ceased to act.

5. In a retriever in combination, three relatively movable members, one a reel another a stationary and the third an intermediate provided with a concentrical guide with an engageable tooth therein, a stop acting between said intermediate and said stationary member to limit the rotation of said intermediate in both directions, a pawl carried by said reel at one end and its free end being engageable, and normally guided by said intermediate permitting said reel to normally rotate in both directions when said intermediate is rotated to its predetermined limit in one direction with said tooth in an upwardly position and permitting its rotation only in one direction when said intermediate is rotated to its predetermined limit in opposite direction permitting a dog to automatically drop into engagement therewith.

6. In a retriever in combination, a rope reel, centrifugally acting dogs carried by said rope reel, a power spring, an intermediate rotatable member adapted to be limited in its rotation in both directions and normally held stationary being provided with a guide having an engageable tooth therein for controlling the free end of said centrifugally acting dogs normally permitting said rope reel to rotate in both directions while said tooth being in an upwardly position and permitting its rotation only in one direction when said guide is rotated in a predetermined different position by said power spring permitting a dog to automatically drop into engagement therewith.

7. In a retriever in combination, a rope reel and a power spring adapted to actuate said rope reel, means between said rope reel and power spring thrown into action by the unwinding of said power spring permitting said rope reel to rotate in rope winding direction after said power spring has ceased to act upon it and retain its engagement therewith in opposite direction until rewound to its predetermined limit permitting of winding the rope without further unwinding said power spring.

8. In a retriever in combination, three relatively rotatable members one a stationary, another a rotatable and an intermediate member, a power spring connected under strain between the intermediate and one of the other members by a spring actuated pawl, a pawl independent of impelling spring pivoted to one and normally controlled by the other to automatically connect the intermediate to the member not connected with the power spring.

9. In a retriever in combination, a retriever spring, a retaining pawl and ratchet to hold said retriever spring wound, a pawl actuating spring to automatically engage and release said pawl, a lug adapted to push said pawl beyond its pivot over its actuating spring to engage said power spring after winding it to its predetermined limit.

10. In a retriever in combination, a retriever spring, a retaining pawl and a ratchet to hold said retriever spring wound, a pawl actuating spring automatically thrown into action after winding said retriever spring to its predetermined limit to engage and disengage said pawl from said ratchet.

11. In a retriever in combination, a retriever spring, a rotary member to hold said retriever spring under strain being provided with a stop to limit the unwinding of said retriever spring, a rocker, a pawl pivoted to said rocker, a pawl actuating spring, a spring pressing said rocker to produce frictional resistance when moving it to actuate said pawl by said pawl actuating spring for engaging the power spring after winding it to its predetermined limit.

12. In a retriever in combination, a rotary retrieving member a spring urging said member in one direction and a stop to limit its rotation in both directions, a stationary member, a pawl actuating spring, a pawl mounted pivotally movable between abutments on said stationary member being thrown into action when automatically pushed beyond its pivot over said pawl actuating spring to engage the retrieving member when rotated to its predetermined limit.

13. In a retriever the combination of a revolvable member and a normally stationary member, a dog pivoted to one and normally controlled by a guide on the other to interlock said members when one of them is abnormally rotated.

14. The combination with a reel, of a centrifugal dog pivotally mounted and adapted to revolve with said reel, a concentrical guide with an engageable tooth therein normally tending to hold the free end of said dog toward the center of revolution and engageable with said tooth when said reel is abnormally rotated.

15. The combination with a reel, of a centrifugal dog pivotally mounted and adapted to revolve with said reel, a revolvable member adapted to limit its revolutions in both directions being provided with a concentrical guide having an engageable tooth therein normally tending to hold the free end of said dog toward the center of revolution when said guide is normally held with said tooth in an upwardly position and permitting said dog to automatically drop into engagement with said tooth when said guide is rotated to a predetermined different position.

16. A normally stationary member adapted to be limited in its rotation in both directions being provided with an engageable guide to normally hold a dog toward the center of revolution when rotated to one position and permitting a dog to automatically drop into engagement therewith when rotated to the other position.

ARTHUR J. HOULE.